United States Patent
Shibaki et al.

(10) Patent No.: US 8,040,557 B2
(45) Date of Patent: Oct. 18, 2011

(54) IMAGE PROCESSING APPARATUS AND IMAGE PROCESSING METHOD

(75) Inventors: Hiroyuki Shibaki, Tokyo (JP); Noriko Miyagi, Kanagawa (JP); Satoshi Ouchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 878 days.

(21) Appl. No.: 11/950,905

(22) Filed: Dec. 5, 2007

(65) Prior Publication Data

US 2008/0144975 A1    Jun. 19, 2008

(30) Foreign Application Priority Data

Dec. 14, 2006    (JP) ................. 2006-336592

(51) Int. Cl.
G06F 3/12    (2006.01)
G06F 15/00    (2006.01)
H04N 1/00    (2006.01)

(52) U.S. Cl. ............. 358/1.9; 358/1.1; 358/1.2; 358/1.3; 358/1.16

(58) Field of Classification Search .............. 358/1.1, 358/1.2, 1.9, 1.16, 518, 519, 521, 523, 524, 358/1.3; 382/162, 167
See application file for complete search history.

(56) References Cited

U.S. PATENT DOCUMENTS

| | | | |
|---|---|---|---|
| 7,298,522 B2* | 11/2007 | Sugimoto | 358/1.3 |
| 2003/0043392 A1* | 3/2003 | Sugimoto | 358/1.9 |
| 2003/0047099 A1* | 3/2003 | Hanyu | 101/484 |
| 2006/0056683 A1* | 3/2006 | Komatsu | 382/162 |
| 2006/0082825 A1* | 4/2006 | Lee | 358/1.15 |
| 2006/0181726 A1* | 8/2006 | Naito et al. | 358/1.9 |
| 2007/0211277 A1* | 9/2007 | Kaneko et al. | 358/1.9 |

FOREIGN PATENT DOCUMENTS

| | | |
|---|---|---|
| JP | 7-107280 | 4/1995 |
| JP | 9-219790 | 8/1997 |
| JP | 11-136515 | 5/1999 |
| JP | 2005-277945 | 10/2005 |

OTHER PUBLICATIONS

Mar. 30, 2011 Japanese official action in connection with a counterpart Japanese patent application.

* cited by examiner

*Primary Examiner* — Kimberly A Williams
(74) *Attorney, Agent, or Firm* — Cooper & Dunham LLP

(57) ABSTRACT

An image processing apparatus includes a setting unit, a converting unit, and a transmitting unit. The setting unit sets a save-mode for image data to be output to reduce color of image data. When the save-mode is set for image data, the converting unit converts reduces color of the image data to convert the image data into save-mode image data. The transmitting unit transmits the save-mode image data to an external device.

12 Claims, 10 Drawing Sheets

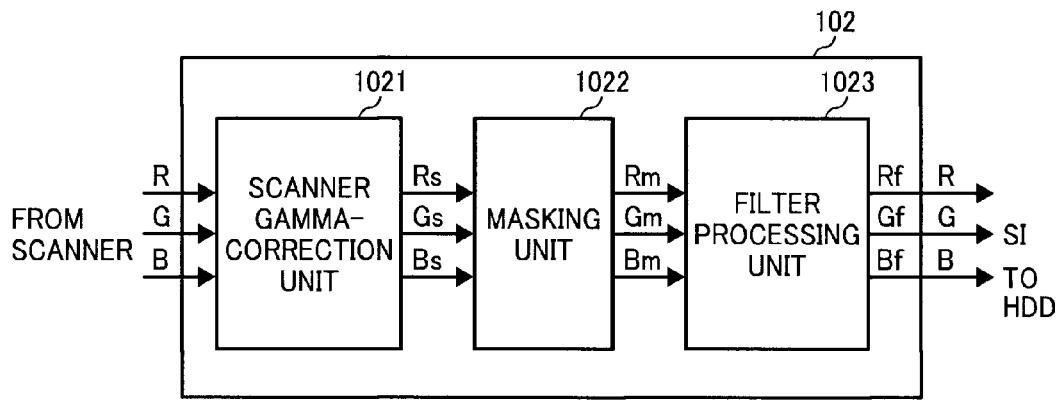
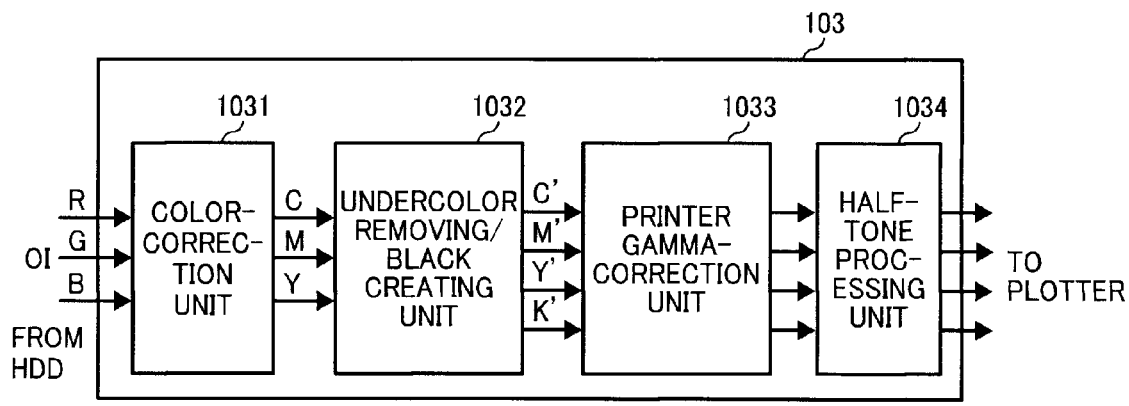
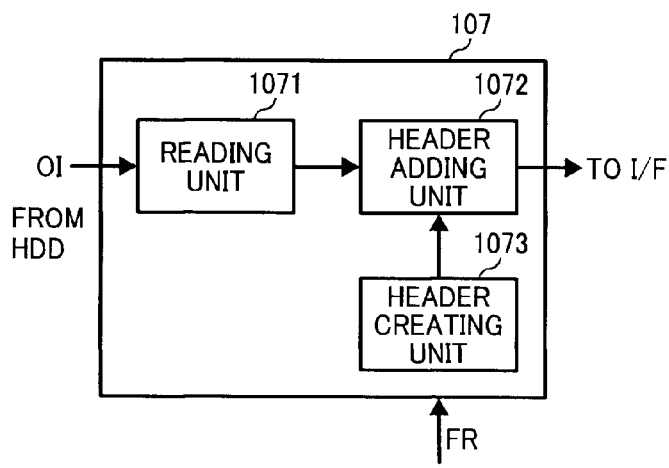

FIG. 8
| f | g | h |
|---|---|---|
| i | j | k |
| l | m | n |
FIG. 9A
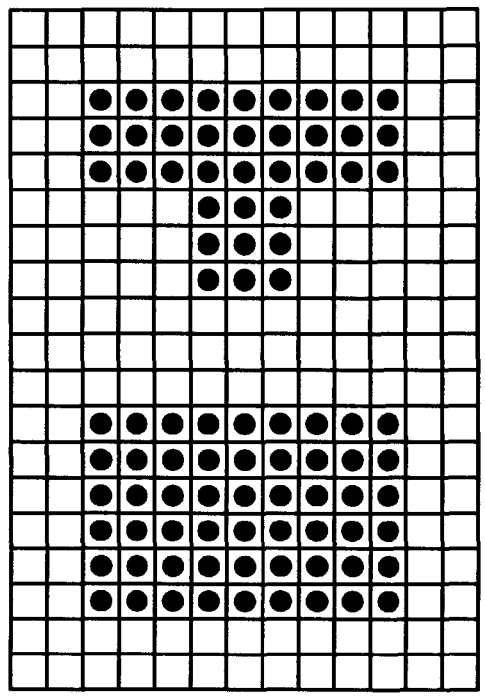
FIG. 9B
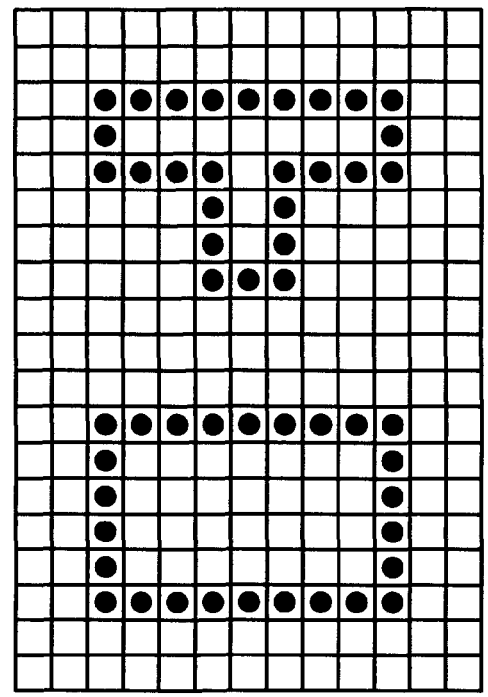

FIG. 19

| DIGITAL VALUE | 0 | 64 | 128 | 192 | 255 |
|---|---|---|---|---|---|
| LIGHTNESS BASED ON NORMAL-MODE PROFILE | 20 | 30 | 50 | 70 | 85 |
| LIGHTNESS BASED ON TONER SAVE-MODE PROFILE | 50 | 55 | 65 | 75 | 85 |

IMAGE PROCESSING APPARATUS AND IMAGE PROCESSING METHOD

CROSS-REFERENCE TO RELATED APPLICATIONS

The present application claims priority to and incorporates by reference the entire contents of Japanese priority document 2006-336592 filed in Japan on Dec. 14, 2006.

BACKGROUND

1. Technical Field

This disclosure relates to a technology for outputting an image with less amount of coloring material.

2. Description of the Related Art

Some image processing apparatuses have a toner-save mode for outputting an image with less coloring material such as toner and ink, in addition to a normal-mode for generating and outputting higher-quality image data. The toner-save mode is selected when quality of output image is less emphasized because, for example, the output image is used just for checking its layout.

There are various methods of reducing toner consumption such as a method of reducing image density, a method based on a logical multiplication between a dithered image and a pixel-skip pattern, a method of using pulse-width modulation, and a method of controlling light-intensity for writing. According to these methods, density of an image to be output is lower, and therefore, the output image is not as good as an image that is output in the normal mode.

For example, Japanese Patent Application Laid-open No. H9-219790 discloses a conventional technology of reducing toner consumption by identifying edges in a bitmap image and reducing an amount of toner based on the identified edges. Japanese Patent Application Laid-open No. H7-107280 discloses another conventional technology of reducing toner consumption by detecting edges and processing a portion other than the edges in toner-save mode.

The conventional technologies require a printer having the toner-save mode. Moreover, when image data processed in the toner-save mode (hereinafter, "toner save-mode image") is transmitted to an external device, the external device cannot display the toner save-mode image as the one in the normal mode (hereinafter, "normal-mode image").

BRIEF SUMMARY

In an aspect of this disclosure, an image processing apparatus includes: a setting unit that sets a mode for first image data to be output, the mode including a save-mode to reduce color of image data; a converting unit that, when the setting unit sets the save-mode, reduces color of the first image data to convert the first image data to second image data; and a transmitting unit that transmits the second data to an external device.

In another aspect, an image processing apparatus includes: a setting unit that sets a mode for first image data to be output, the mode including a save-mode to reduce color of image data; a converting unit that, when the setting unit sets the save-mode, reduces color of the first image data to convert the first image data to second image data; and a transmitting unit that transmits the first image data and the second data as a file to an external device.

In another aspect, an image processing method includes: setting a mode for first image data to be output, the mode including a save-mode to reduce color of image data; converting, when the save-mode is set, the first image data to second image data by reducing color of the first image data; and transmitting the first image data and the second data as a file to an external device.

The aforementioned and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 2 is a block diagram of a pre-processing unit shown in FIG. 1;

FIG. 3 is a block diagram of a post-processing unit shown in FIG. 1;

FIG. 4 is a block diagram of a file creating unit shown in FIG. 1;

FIG. 8 is a schematic diagram of a detection pattern used by a pattern matching circuit shown in FIG. 7;

FIG. 9A is a schematic diagram of a binarized image;

FIG. 9B is a schematic diagram for explaining an edge determination result of the binarized image shown in FIG. 9A;

FIG. 19 is a table for explaining lightness defined by a normal-mode profile and a toner save-mode profile shown in FIG. 18.

DETAILED DESCRIPTION OF THE PREFERRED EMBODIMENTS

Exemplary embodiments of the present invention are described in detail below with reference to the accompanying drawings.

Figure 1:
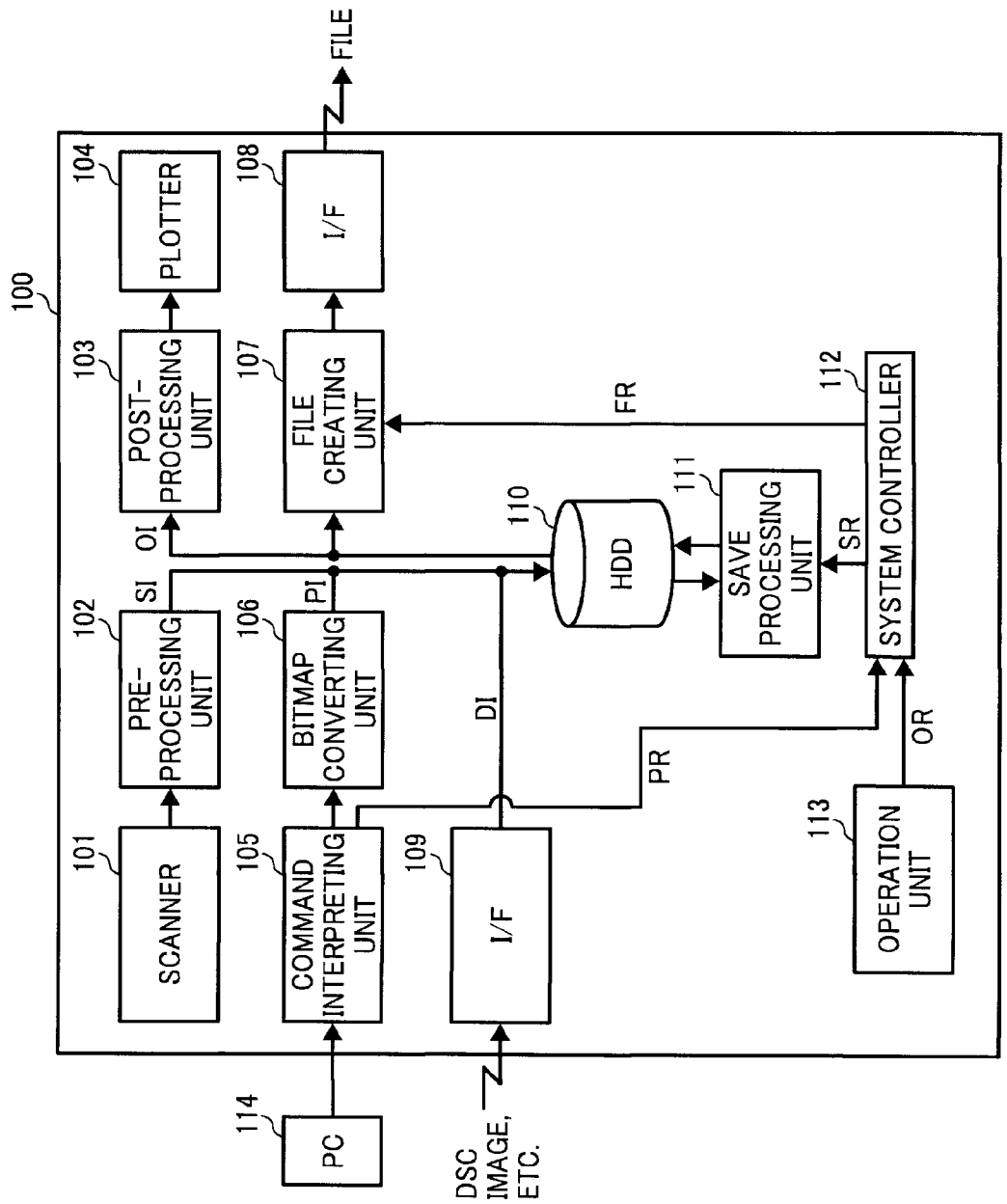
FIG. 1 is a block diagram of an image processing apparatus according to a first embodiment of the present invention.

FIG. 1 is a block diagram of an image processing apparatus 100 according to a first embodiment of the present invention. The image processing apparatus 100 receives an image signal from a personal computer (PC) 114 or through any one of a scanner 101 and an interface (I/F) 109. The image signal is processed, and then output to either a plotter 104 or an I/F 108.

Upon receiving an image signal from the scanner 101, a pre-processing unit 102 processes the image signal into an image signal SI in a manner as described in detail later. The image signal SI is stored in a hard disk drive (HDD) 110.

FIG. 2 is a block diagram of the pre-processing unit 102. The image signal received from the scanner 101 is converted by a scanner gamma-correction unit 1021 from a linear-reflectance signal into a linear-density signal.

The scanner gamma-correction unit 1021 converts red (R), green (G), and blue (B) signals into Rs, Gs, and Bs signals by referring to a one-dimensional table. A masking unit 1022 converts the Rs, Gs, and Bs signals depending on the input device into regular RGB signals (Rm, Gm, and Bm signals) independent of the input device by masking calculation, more particularly, by using the following Equation 1A, 1B, and 1C:

$$Rm = \alpha11 \times Rs + \alpha12 \times Gs + \alpha13 \times Bs + \beta1 \quad (1A)$$

$$Gm = \alpha21 \times Rs + \alpha22 \times Gs + \alpha23 \times Bs + \beta2 \quad (1B)$$

$$Bm = \alpha31 \times Rs + \alpha32 \times Gs + \alpha33 \times Bs + \beta3 \quad (1C)$$

A filter processing unit 1023 corrects spatial frequency-characteristics of the Rm, Gm, and Bm signals. More particularly, the filter processing unit 1023 performs sharpening correction of an image such as letters that requires sharp edges by using an edge emphasizing filter, and performs smoothing correction of an image such as a photograph that requires smooth edges by using a smoothing filter. The image signal SI (Rf, Gf, and Bf signals) output from the filter processing unit 1023 is sent to the HDD 110, and is stored in the HDD 110.

Upon receiving from the PC 114 an image signal of, for example, a document created by application software on the PC 114, i.e., image data converted into a print command described in a printer description language through a driver in response to a print instruction from a user, a command interpreting unit 105 interprets the print command. A bitmap converting unit 106 then converts the print command to a bitmap image PI. The bitmap image PI is stored in the HDD 110. The command interpreting unit 105 checks whether the toner-save mode is selected, and sends a save-mode selection signal PR indicative of result of the check to a system controller 112. Based on the save-mode selection signal PR, the system controller 112 sends a signal SR to a save processing unit 111 or a signal FR to a file creating unit 107.

Upon receiving an image DI, for example a digital still camera (DSC) image, via the I/F 109, the image processing apparatus 100 stores the image DI in the HDD 110 without processing it.

An image temporarily stored in the HDD 110 is output as, for example, being printed on a sheet by the plotter 104, or being transmitted to the outside via the I/F 108.

To output an image printed on a sheet by the plotter 104, a post-processing unit 103 processes an image signal OI read from the HDD 110, and sends it to the plotter 104. The plotter 104 prints an image on a sheet based on the image signal received from the post-processing unit 103.

FIG. 3 is a block diagram of the post-processing unit 103. The image signal OI is sent from the HDD 110 to a color-correction unit 1031. The color-correction unit 1031 converts the RGB image signals OI into CMY image signals. Each of the CMY image signals corresponds to each color material used in a printer. It is assumed that, from among various color correcting techniques, masking calculation is performed by using the following Equation 2A, 2B, and 2C, which correspond to Equation 1A, 1B, and 1C:

$$C = \eta11 \times R + \eta12 \times G + \eta13 \times B + \theta1 \quad (2A)$$

$$M = \eta21 \times R + \eta22 \times G + \eta23 \times B + \theta2 \quad (2B)$$

$$Y = \eta31 \times R + \eta32 \times G + \eta33 \times B + \theta3 \quad (2C)$$

where η11 to η31 and θ1 to θ3 are predetermined color correction coefficients, and C, M, and Y are output from the color-correction unit 1031 and 8-bit signals (indicative of one of values from 0 to 255).

The image signals output from the color-correction unit 1031 are sent to an undercolor removing/black creating unit 1032. The undercolor removing/black creating unit 1032 creates a K' signal corresponding to black color, and removes undercolor from the CMY image signals by using the following Equation 3A, 3B, 3C, and 3D to output CMYK image signals:

$$K' = \text{Min}(C, M, Y) \times \beta4 \quad (3A)$$

$$C' = C - K \times \beta5 \quad (3B)$$

$$M' = M - K \times \beta5 \quad (3C)$$

$$Y' = Y - K \times \beta5 \quad (3D)$$

where Min(C, M, and Y) is a minimum value from among the CMY signals, β4 and β5 are predetermined coefficients, and C', M', Y', and K' are 8-bit signals.

Upon receiving the C', M', Y', and K' signals, a printer gamma-correction unit 1033 performs gamma correction on the C', M', Y', and K' signals based on printer engine characteristics. A halftone processing unit 1034 performs a halftone process, for example ordered dithering process, on the signals, and outputs them.

If receiving a request for a plurality of copies of an image via an operation unit 113, the image processing apparatus 100 reads the image signal from the HDD 110 several times equivalent to the requested number of copies and reproduces the image each time.

To output, i.e., transmit, an image to the outside as an image file, the file creating unit 107 reads a target image signal from the HDD 110. The file creating unit 107 converts the target image signal to a predetermined file format, and outputs the image signal as a file.

FIG. 4 is a block diagram of the file creating unit 107. The file creating unit 107 includes a reading unit 1071, a header creating unit 1073, and a header adding unit 1072. The reading unit 1071 reads image data from the HDD 110. The header creating unit 1073 creates a header based on a specified file format, and sends the header to the header adding unit 1072. The header adding unit 1072 adds the header to the image data, thereby creating an image file. Upon receiving the image file from the file creating unit 107, the I/F 108 transmits the image file to the outside. The file format can be a unique format as well as a general format such as a tagged image file format (TIFF) or a portable document format (PDF).

The image signal received from the PC 114, or through any one of the scanner 101, and the external I/F 109 is once stored in the HDD 110, and then is sent to either the plotter 104 or the outside. Such functions are equivalent to those of an ordinary multifunction product.

The toner-save mode according to an embodiment of the present invention is described below. When the toner save-mode is selected through the operation unit 113, an image received via the scanner 101 or the I/F 109 is printed with less toner. When the toner save-mode is selected, a signal OR indicative of a request for outputting an image in the toner save-mode is activated and is sent to the system controller 112. Upon receiving the signal OR, the system controller 112 sends the signal SR indicative of the toner-save mode being ON to the save processing unit 111. Upon receiving the SR signal, the save processing unit 111 reads a target image to be processed from the HDD 110, processes the target image such that an amount of toner consumption is reduced, and writes the processed target image back to the HDD 110.

Figure 5:
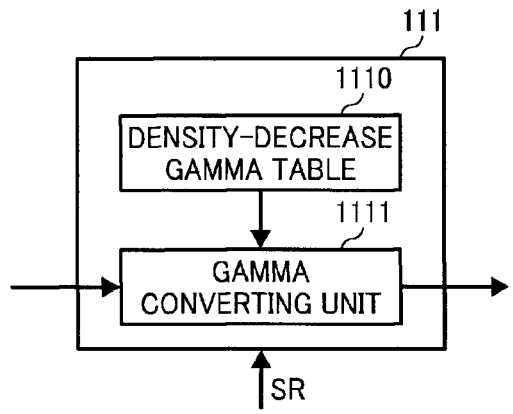
FIG. 5 is a block diagram of a save processing unit shown in FIG. 1.

FIG. 5 is a block diagram of the save processing unit 111. The save processing unit 111 implements the toner-save mode, i.e., a mode in which an image is printed with a less amount of color materials such as toner or ink than in normal mode. The save processing unit 111 suppresses toner consumption by gamma conversion. More particularly, a gamma converting unit 1111 performs gamma conversion on an image signal read from the HDD 110 to obtain toner save-mode image data by referring to a density-decrease gamma table 1110, and writes the toner save-mode image data back to the HDD 110. The density of the toner save-mode image data is lower than that of the image signal before processed.

If the image signal processed by the save processing unit 111 is to be printed on a sheet, the image signal is sent to the plotter 104 via the post-processing unit 103 and then printed by the plotter 104. If the image signal is to be transmitted to the outside as a file, the image signal is sent to the I/F 108 via the file creating unit 107 and then transmitted to the outside. As a result, image signals received in different manners can be uniformly converted into toner save-mode image data, and the toner save-mode image data can be output by various types of outputting units.

If transmitted to an external device such as a PC, a file of toner save-mode image data thus obtained can be printed by any printer connected to the PC, even if the printer does not have the toner save-mode option.

Although, according to the first embodiment, the save processing unit 111 uniformly decreases density of image data in the toner-save mode, there are other types of toner-save mode. For example, toner-saving can be applied only to a portion other than edges such that toner consumption is reduced to achieve high toner-save effect while clear vision of letters and lines is maintained. Such toner-save mode is explained below.

Figure 6:
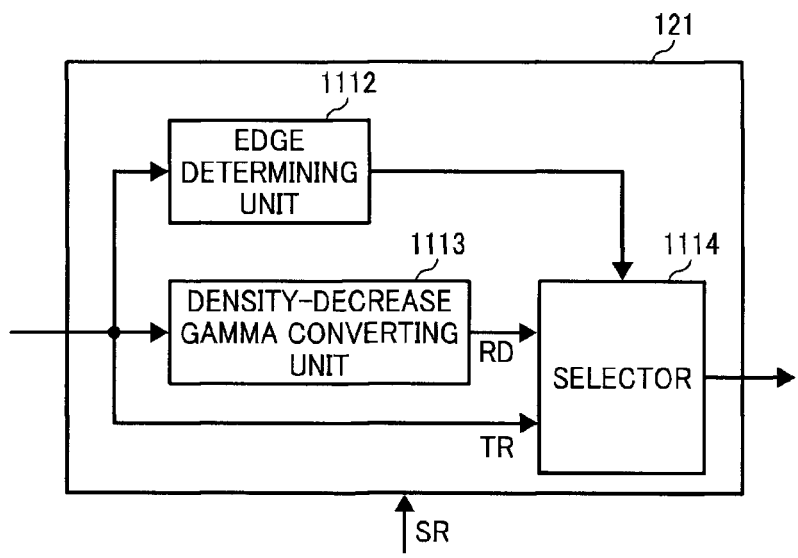
FIG. 6 is a block diagram of a save processing unit according to a second embodiment of the present invention.
Figure 7:
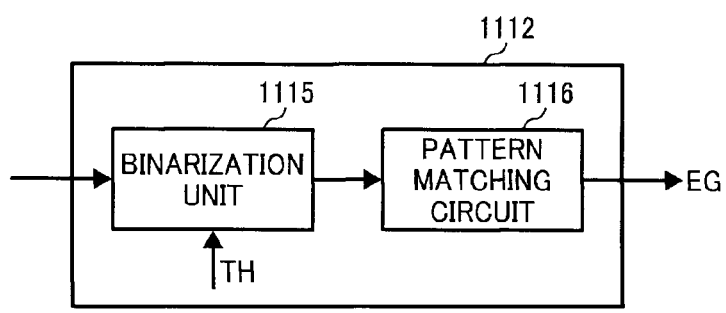
FIG. 7 is a block diagram of an edge determining unit shown in FIG. 6.

FIG. 6 is a block diagram of a save processing unit 121 according to a second embodiment of the present invention. The save processing unit 121 includes an edge determining unit 1112, a density-decrease gamma converting unit 1113, and a selector 1114. The edge determining unit 1112 performs edge determination. FIG. 7 is a block diagram of the edge determining unit 1112. When the edge determining unit 1112 receives image data, a binarization unit 1115 binarizes the image data by using a threshold TH, and then a pattern matching circuit 1116 detects edges (contours) in the image data. A value of the threshold TH is decided depending on density of target letters for the edged determination, and is set to, for example, 32 (white: 255, black: 0). FIG. 8 is a schematic diagram of a detection pattern used by the pattern matching circuit 1116. The pattern matching circuit 1116 detects edges from a reference pixel j and its surrounding pixels by using the following Equation 4:

$$\text{if}(j\&\&g\&\&k\&\&m)=1, \text{ then pixel } j=\text{non-edge pixel},$$
$$\text{else pixel } j=\text{edge pixel} \qquad (4)$$

where binarized ON dots (dots larger than the threshold TH) are set to be active.

If pattern matching is performed on a binarized image as shown in FIG. 9A by using Equation 4, an image as shown in FIG. 9B is obtained. It can be seen from FIGS. 9A and 9B that each pixel is determined whether to be an edge pixel. Result of the pattern matching, i.e., logical signal indicative of active edge pixels (hereinafter, "edge determination result EG") is sent to the selector 1114. The image signal input to the edge determining unit 1112 is also sent to the density-decrease gamma converting unit 1113. The density-decrease gamma converting unit 1113 converts the image signal into a signal RD with a lower density by using a gamma table. The image signal is also sent to the selector 1114 as a signal TH. The selector 1114 selectively outputs the signal RD or the signal TH based on the edge determination result EG. More particularly, when a pixel to be output is an edge pixel, the selector 1114 outputs the signal TH. When the pixel is not an edge pixel, the selector 1114 outputs the signal RD.

By reducing the density of portions other than edges, toner consumption, a toner save-mode image having clear edges is reproduced. That is, it is possible to achieve sophisticated toner-save mode that can satisfy both high clearness and less toner consumption. Most printers, specifically low-priced personal printers, do not have the above-described sophisticated toner save-mode option.

According to the second embodiment, however, the image processing apparatus sends a toner save-mode image to an external device. Thus, any printer connected to the external device can provide a high-quality toner save-mode image as the plotter 104.

When a toner save-mode image is transmitted to an external device such as a PC, and the PC displays the toner save-mode image on its display screen, a uniformly low-density image (in a case of the first embodiment) or a low-density image but having clear counters (in a case of the second embodiment) is displayed. However, if a normal-mode image is displayed, it is easy to recognize the image.

Figure 10:
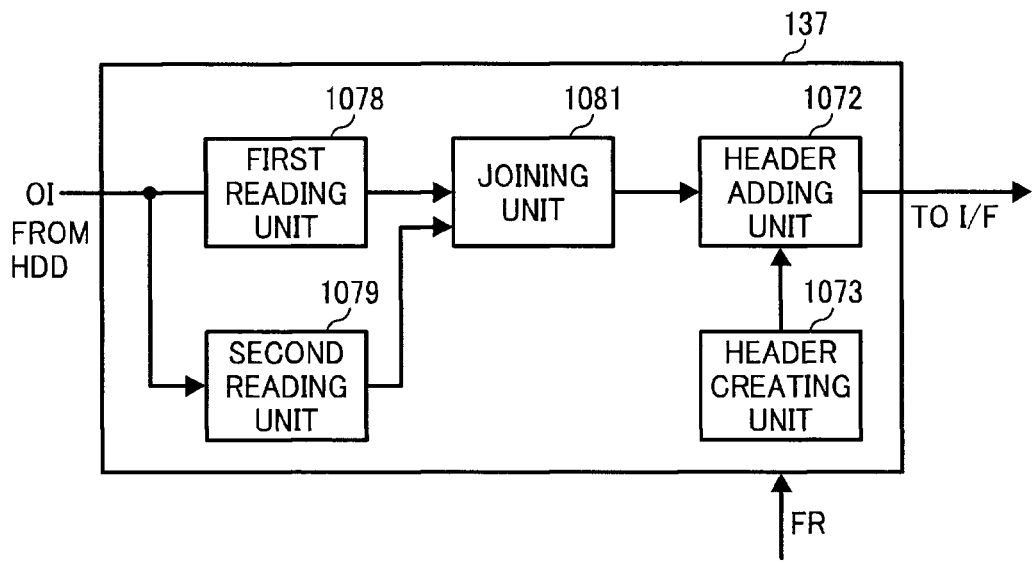
FIG. 10 is a block diagram of a file creating unit according to a third embodiment of the present invention.

An image processing apparatus according to a third embodiment of the present invention is described below with reference to FIGS. 10 and 11. FIG. 10 is a block diagram of a file creating unit 137. The file creating unit 137 includes a first reading unit 1078, a second reading unit 1079, a joining unit 1081, the header adding unit 1072, and the header creating unit 1073. The first reading unit 1078 reads normal-mode image data, and the second reading unit 1079 reads toner save-mode image data from the HDD 110. The joining unit 1081 joins together the normal-mode image data and the toner save-mode image data. The header adding unit 1072 adds a header created by the header creating unit 1073 to the joined image data, thereby creating an image file in a predetermined format. The header created by the header creating unit 1073 contains information concerning each of the normal-mode image and the toner save-mode image (data size, capacity, start address, and color mode). As a result, the file creating unit 137 outputs the image data as a file.

Figure 11:
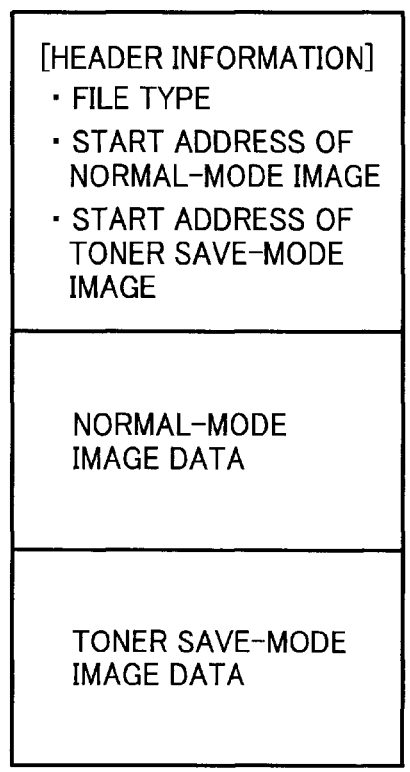
FIG. 11 is a schematic diagram for explaining the data structure of a file created by the file creating unit shown in FIG. 10.

FIG. 11 is a schematic diagram for explaining the data structure of the file created by the file creating unit 137. The header contains predetermined information including a file type, a start address of the normal-mode image, and a start address of the toner save-mode image. Actual image data follows the header.

According to the third embodiment, a file of both normal-mode image and toner save-mode image is sent to a destination. Accordingly, the destination can select either the normal-mode image or the toner save-mode image and displays the selected image on its display screen. Thus, it is possible to display a clear image.

Figure 12:
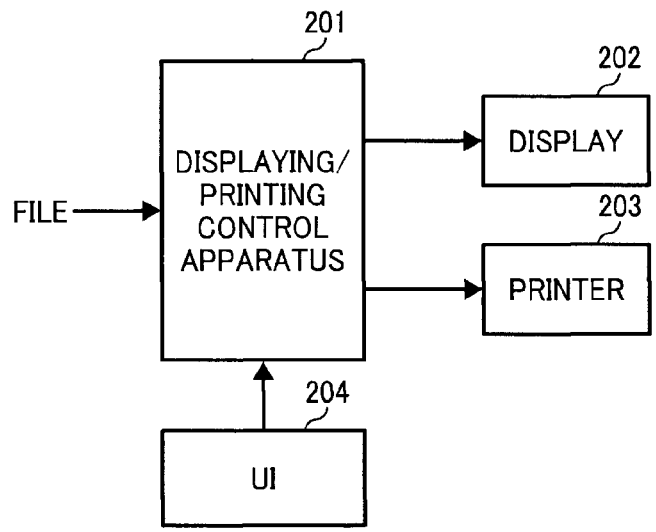
FIG. 12 is a block diagram of a displaying/printing control apparatus according to a fourth embodiment of the present invention.
Figure 13:
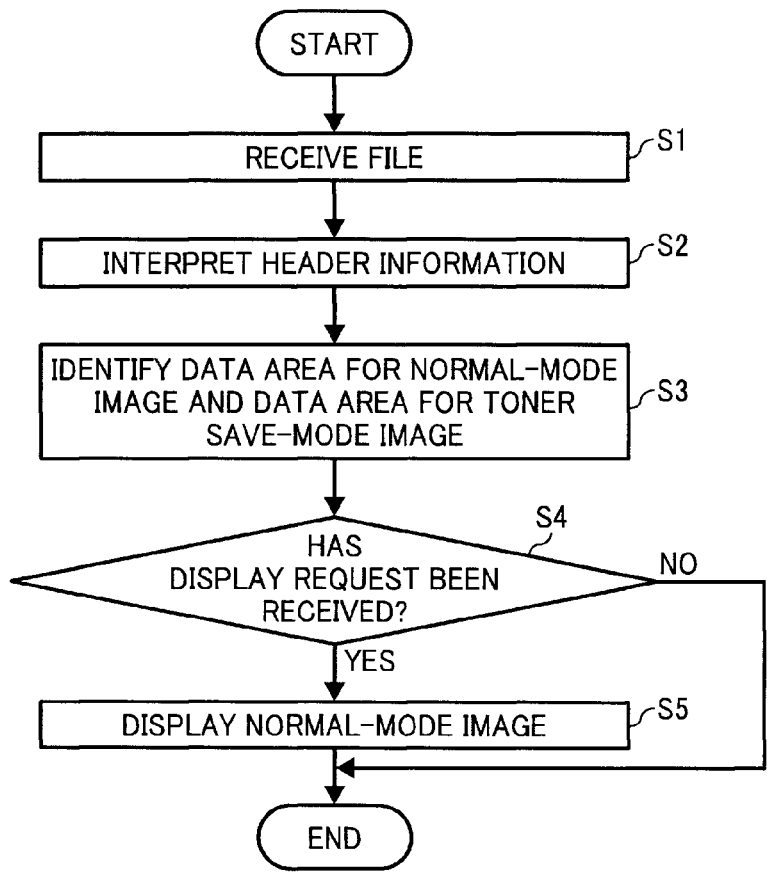
FIG. 13 is a flowchart of an image-display process according to the fourth embodiment.

A displaying/printing control apparatus 201 according to a fourth embodiment of the present invention is described below with reference to FIGS. 12 and 13. The displaying/printing control apparatus 201 receives a file created as described in the third embodiment, and controls displaying of the file on a display 202 or printing of the file by using a printer 203. A PC can work as the displaying/printing control apparatus 201. The displaying/printing control apparatus 201 can receive a display request or a print request from a user via a user interface (UI) 204.

An image-display process performed by the displaying/printing control apparatus 201 is described with reference to FIG. 13. The displaying/printing control apparatus 201 first receives an image file (step S1), and then interprets header information of the image file (step S2). The displaying/printing control apparatus 201 identifies a first data area for normal-mode image data and a second data area for toner save-mode image data based on the header information (step S3). Thereafter, the displaying/printing control apparatus 201 checks whether having received a display request from a user via the UI 204 (step S4). When there is no display request (No at step S4), the image-display process ends. When having received a display request (Yes at step S4), the displaying/printing control apparatus 201 reads the normal-mode image data from the first data area to transmit the normal-mode image data to the display 202. The display 202 displays thereon an image based on the normal-mode image data (step S5).

With this, it possible to display an easy-to-recognize normal-mode image, and achieve high quality image display.

Although a normal-mode image is displayed as a result of the above image-display process, it is also possible to display a toner save-mode image when, for example, a user wishes to just check an image to be printed. If a normal-mode image and a toner save-mode image are selectably displayed or both the images are displayed simultaneously, a user can select one of them to be actually printed, which improves convenience for the user.

Figure 14:
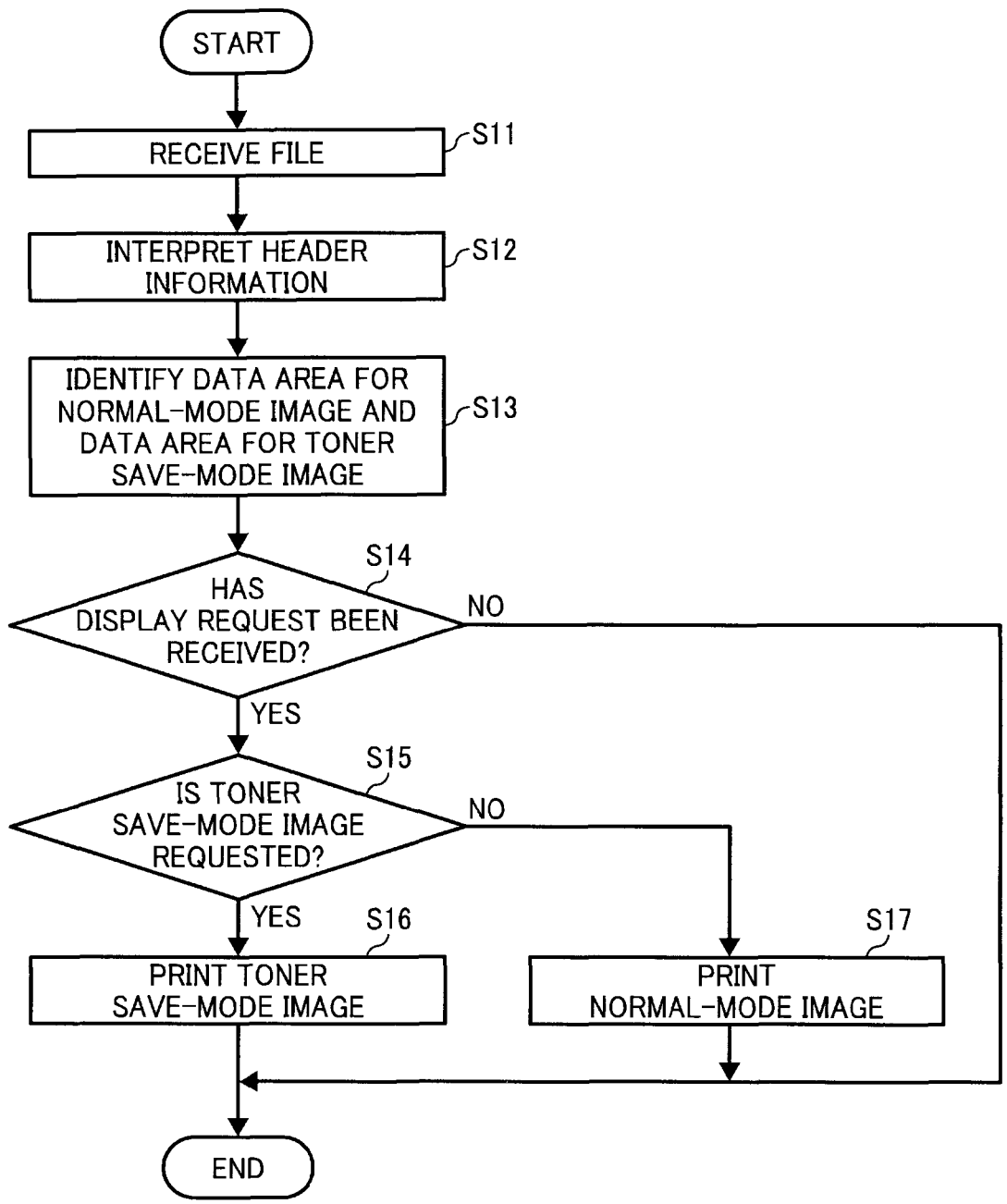
FIG. 14 is a flowchart of an image-print process according to a fifth embodiment of the present invention.

FIG. 14 is a flowchart of an image-print process according to a fifth embodiment of the present invention. As in the fourth embodiment, the displaying/printing control apparatus 201 first receives an image file (step S11), and then interprets header information of the image file (step S12). The displaying/printing control apparatus 201 identifies a first data area for normal-mode image data and a second data area for toner save-mode image data based on the header information (step S13). Thereafter, the displaying/printing control apparatus 201 checks whether having received a print request from a user via the UI 204 (step S14). When having received a print request (Yes at step S14), the displaying/printing control apparatus 201 check whether the print request is a request for output of a toner save-mode image (step S15). When the print request requests a toner save-mode image (Yes at step S15), the displaying/printing control apparatus 201 transmits the toner save-mode image data to the printer 203 so that the printer 203 prints an image based on the toner save-mode image data (step S16). When the print request does not request a toner save-mode image (No at step S15), the displaying/printing control apparatus 201 transmits the normal-mode image data to the printer 203 so that the printer 203 prints an image based on the normal-mode image data (step S17).

Such configuration allows a user to select a normal-mode image or a toner save-mode image to be printed from a received file, and obtain desired output by using any printer.

Figure 15:
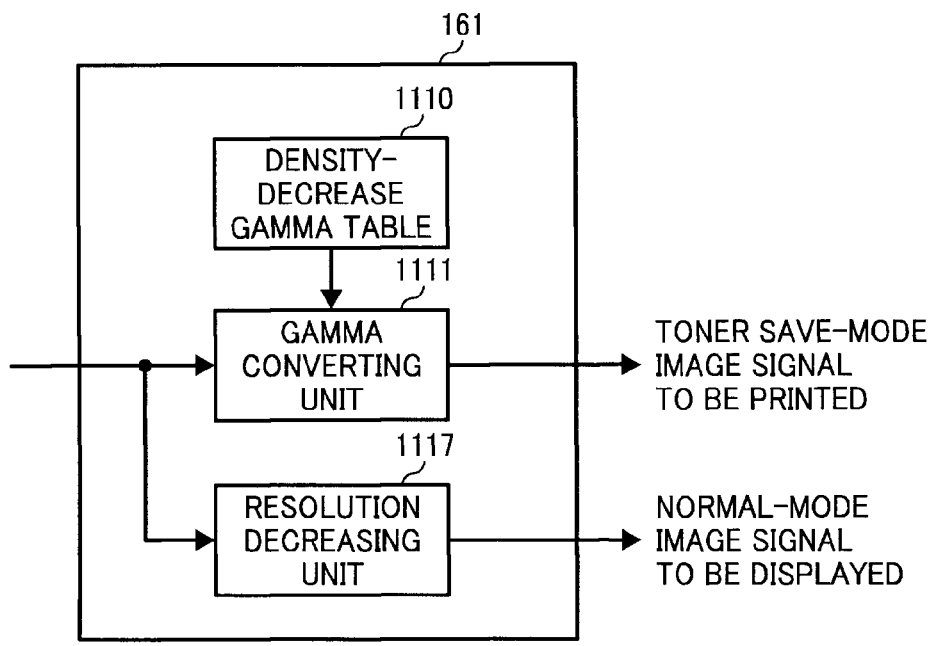
FIG. 15 is a block diagram of a save processing unit according to a sixth embodiment of the present invention.

FIG. 15 is a block diagram of a save processing unit 161 according to a sixth embodiment of the present invention. The save processing unit 161 creates a print image signal and a display image signal. As previously described in connection with FIG. 5, the gamma converting unit 1111 performs gamma conversion on an image signal read from the HDD 110 by using the density-decrease gamma table 1110 to obtain a toner save-mode image signal. At the same time, a resolution decreasing unit 1117 creates a display image signal by decreasing the resolution of the image signal. The resolution decreasing unit 1117 reduces the resolution to about a quarter of its original level. That is, if the resolution of the image signal is 600 dpi (dots per inch), the resolution decreasing unit 1117 reduces the resolution to about 150 dpi. Such level of resolution is enough for displaying an image.

The print image signal and the display image signal are written back to the HDD 110. The file creating unit 107 joins the two image signals together to create a file to be transmitted to the outside.

For transmission via a network, a small-sized file is preferable from a viewpoint of network traffic. A file of image data having normal resolution imposes a heavy load on a network when transmitted via the network. According to the sixth embodiment, the resolution of image data to be displayed, which does not require high resolution, is decreased. Thus, image data with lower resolution can be transmitted to the outside, resulting in less load on the network. Although a toner save-mode image to be printed is created by uniformly decreasing the density of the original image, such an image can be obtained by decreasing the density of a portion other than edges as explained with reference to FIG. 6.

According to the sixth embodiment, toner save-mode image to be printed has a high resolution and a normal-mode image to be displayed has a low resolution. In contrast, based on an assumption that a user understands that the density of a toner save-mode image to be printed differs than that of a normal-mode image, a toner save-mode image to be printed can be provided with low resolution, while a normal-mode image to be displayed can be provided with high resolution. That is, when the user selects toner-save mode, he/she does not require high-quality image output.

Figure 16:
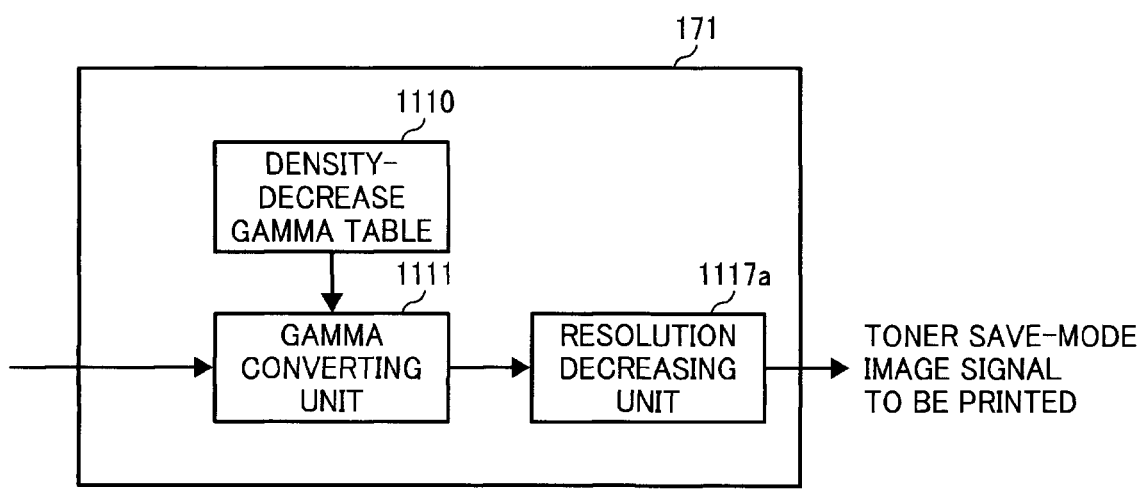
FIG. 16 is a block diagram of a save processing unit according to a seventh embodiment of the present invention.

FIG. 16 is a block diagram of a save processing unit 171 according to a seventh embodiment of the present invention. The save processing unit 171 creates a print toner save-mode image signal with low resolution. As previously described in connection with FIG. 5, the gamma converting unit 1111 performs gamma conversion on an image signal read from the HDD 110 by using the density-decrease gamma table 1110 to obtain a toner save-mode image signal. After that, a resolution decreasing unit 1117a decreases the resolution of the toner save-mode image signal, thereby creating a print toner save-mode image with low resolution. If the resolution of the image signal is 600 dpi for example, the resolution decreasing unit 1117a decreases the resolution to about half of its original level, i.e., about 300 dpi. Such level of resolution is preferable from a viewpoint of balance between image quality and data volume.

The print toner save-mode image of low resolution is written back to the HDD 110. The file creating unit 107 joins the print toner save-mode image and the normal-mode image stored in the HDD 110 together to create a file to be transmitted to the outside. Such configuration makes it possible to transmit a file containing an image to be displayed and an image with low resolution enough to be printed while suppressing a volume of the file.

Figure 17:
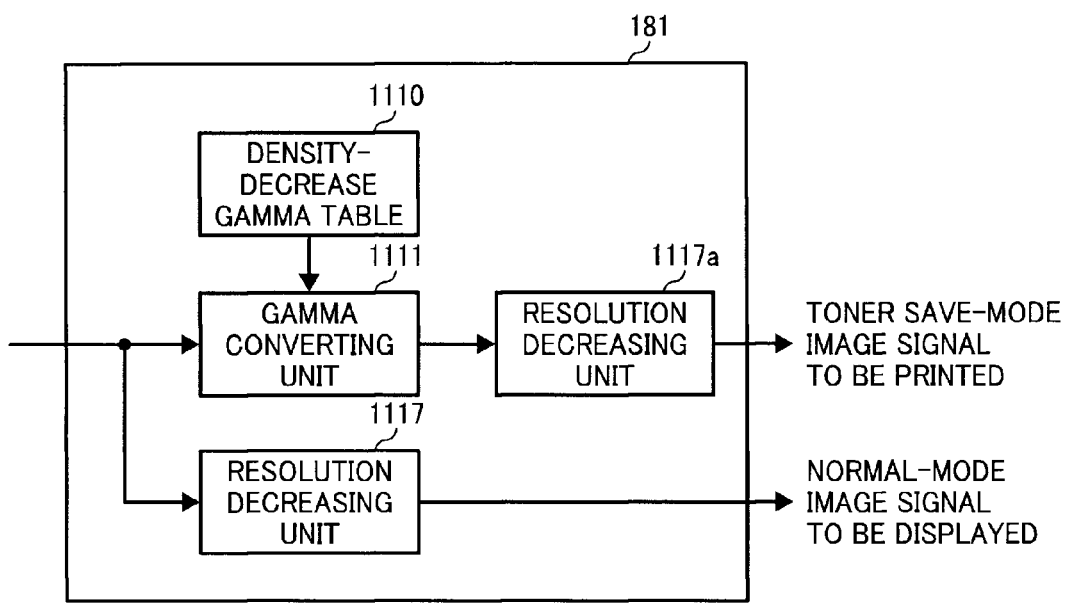
FIG. 17 is a block diagram of a save processing unit according to an eighth embodiment of the present invention.

FIG. 17 is a block diagram of a save processing unit 181 according to an eighth embodiment of the present invention. The save processing unit 181 has the functions a combination of the save processing unit 161 and the save processing unit 171 previously described in the sixth and seventh embodiments. That is, the save processing unit 181 creates a low-resolution print image with a low density and a low-resolution display image. The resolution decreasing unit 1117a decreases the resolution of print toner save-mode image data to, for example, 300 dpi. The resolution decreasing unit 1117 decreases the resolution of display image data to, for example, 150 dpi. Such configuration makes it possible to create a small-sized file, resulting in less load on the network.

The file to be transmitted is explained above as containing a toner save-mode image signal and a normal-mode image signal. However, only a normal-mode image signal can be transmitted with profile information (information on different profiles) to further reduce file size and load on the network as well as to achieve both toner-save mode and normal mode.

Figure 18:
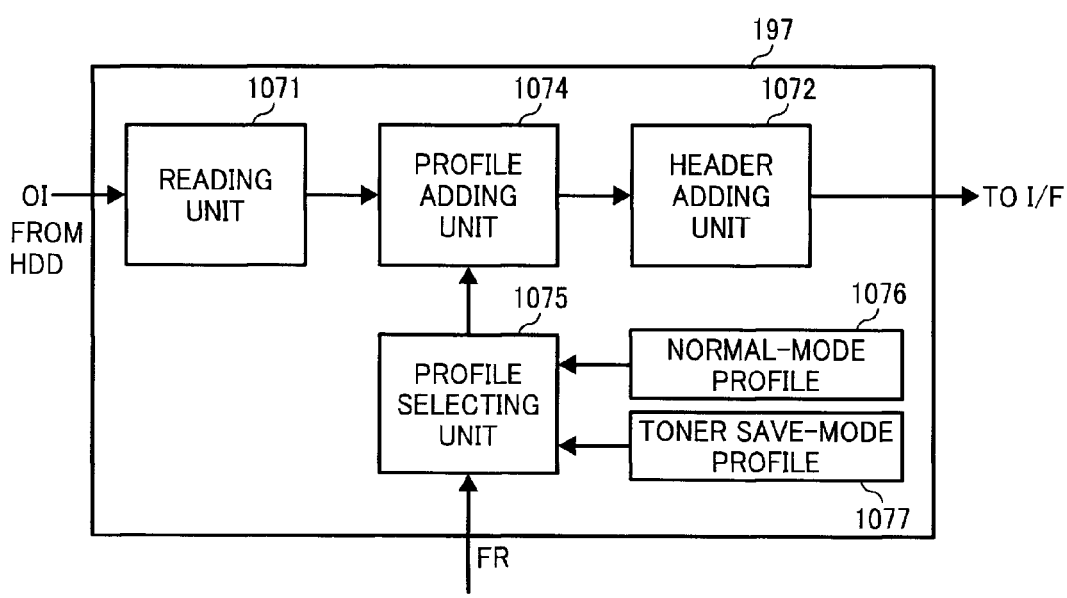
FIG. 18 is a block diagram of a file creating unit according to a ninth embodiment of the present invention.

FIG. 18 is a block diagram of a file creating unit 197 according to a ninth embodiment of the present invention. The save processing unit is not used in the ninth embodiment. A signal output from the pre-processing unit 102 is temporarily stored in the HDD 110. The file creating unit 197 reads the signal from the HDD 110 and creates a file of the signal.

Specifically, the reading unit 1071 reads image data from the HDD 110. A profile adding unit 1074 adds a color profile to the image data. A profile selecting unit 1075 selects either one of a normal-mode profile 1076 or a toner save-mode profile 1077 as the color profile and sends the selected profile to the profile adding unit 1074. The header adding unit 1072 adds a header to the image data added with the color profile, thereby creating a file to be transmitted. The file is transmitted to the outside via the I/F 108.

The color profile, specifically an international color consortium (ICC) profile, is used in a color management system. The ICC profile is a file (conversion table) that describes how a particular device reproduces color; that is, it is used to translate color data created on one device into the color space of another device via a common color space known as a profile connection space.

As well as hardware devices, such as scanners, monitors and printers, image data also has its own ICC profile. If ICC profiles are properly used in the color management system, each device can reproduce colors closest to those of data from among colors that the device can reproduce.

For example, when the color management system receives an image to be printed via a scanner, RGB values of the image is first converted into Lab values based on the common color space by using an ICC profile that describes the color space of the image. If the image is to be displayed on a monitor, the Lab values based on the common color space is converted into RGB values based on the characteristic of the monitor by using a unique ICC profile of the monitor. If the image is to be printed by a printer, the Lab values of the image based on the common color space is converted into RGB values based on the characteristic of the printer driver by using a unique ICC profile of the printer. As a result, colors that are displayed on the monitor or printed are similar to original colors in the scanned image.

Based on such a mechanism of the color management system, when the toner-save mode is selected, a profile is created that indicates original colors of an scanned image are darker than colors of a toner-save mode image obtained from the scanned image, and this profile is used as the toner save-mode profile 1077. Although an actual profile is described with respect to an ROB color space, for simplicity of description, it is described how to define lightness (L) with respect to a grayscale (digital values from 0 to 255) by using a one-dimensional model.

FIG. 19 is a table for explaining lightness defined by the normal-mode profile and the toner save-mode profile. In the normal-mode profile, the digital values 0, 64, 128, 192, and 255 correspond to the lightness values L 20, 30, 50, 70, and 85, respectively. If a printer having an arbitrary color matching system outputs an image by using the normal-mode profile, the corresponding lightness is reproduced.

In the toner save-mode profile, the digital values 0, 64, 128, 192, and 255 correspond to the lightness values L 50, 55, 65, 75, and 85, respectively. If an image is printed by using the toner save-mode profile, a pixel having a grayscale of 0 (zero) is reproduced with lightness L=50. Specifically, a color that is supposed to be reproduced as a low-light color with L=20 is reproduced as a middle-light color with L=50.

By using scanned data added with a profile different from the normal-mode profile, an image can be printed with a low amount of toners. Because a toner save-mode image does not need to be transmitted, it is possible to create a small-sized file but can be used for both toner save-mode image and normal-mode image. Moreover, if the scanned data added with a plurality of profiles is used, it is possible to select an appropriate toner save-mode image from among various types of toner save-mode images having a different toner-consumption amount.

Instead of the above-described image data to be transmitted, there can be used image data added with both the normal-mode profile and the toner save-mode profile, or image data added with a gamma conversion table for density conversion instead of the toner save-mode profile.

The processes or functions of the embodiments can be implemented by software. In other words, a computer program can be executed on a computer to realize the same functions as described in the above embodiments. Such a computer program can be provided as being stored in a recording medium. For example, a CPU (central processing unit) or an MPU (micro processing unit) of the computer reads the computer program from the recording medium and executes it to perform the functions. Examples of the recording medium include flexible disk (FD), a HDD, an optical disk, a magneto optical disk, a magnetic tape, a nonvolatile memory card, and a read only memory (ROM). An operating system (OS) on the computer can execute part or the entire processes according to the computer program. Moreover, the computer program read from the recording medium can be stored in a memory of a feature expansion board of the computer or a feature expansion unit that is connected to the computer. A CPU of the feature expansion board or the feature expansion unit reads the computer program from its memory and executes it to implement part or the entire processes.

According to an aspect of the present invention, any printer that receives a file from an image processing apparatus can print the file in toner-save mode even if the printer does not have the toner save-mode option. The printer can provide a print equivalent in quality to that obtained by the image processing apparatus. A user can select how the file is to be output, i.e., output in toner-save mode or normal mode.

Moreover, a device that receives the file can cause a displaying unit to display thereon an image as easy to be recognized as is the original image. The printer that receives the file can print the image in normal mode as well as in toner-save mode.

Furthermore, a small-sized file to be transmitted can be created so that a load on a network can be suppressed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a setting unit that sets a mode for first image data to be output, the mode including a save-mode to reduce color of image data;
a converting unit that, when the setting unit sets the save-mode, reduces color of the first image data to convert the first image data to color save-mode image data;
a plotter that prints an image, based on the color save-mode image data, onto a recording medium with low consumption of coloring material; and
a transmitting unit that transmits the color save-mode image data to an external device, wherein
in the save-mode, the image processing apparatus generates an image file including a header, the first image data and the color save-mode image data, and transmits the image file including the header, the first image data and the color save-mode image data to the external device, and
the header of the image file includes address information, and any one of the first image data and the color save-mode image data is extractable from the image file by using the address information in the header.

2. The image processing apparatus according to claim 1, wherein in the save-mode, the image processing apparatus generates an image file including a header and the color save-mode image data, and transmits the image file including the header and the color save-mode image data to the external device, and the header of the image file includes a color profile to restore the color save-mode image data to the first image data.

3. An image processing apparatus comprising:
a setting unit that sets a mode for first image data to be output, the mode including a save-mode to reduce color of image data;
a converting unit that, when the setting unit sets the save-mode, reduces color of the first image data to convert the first image data to color save-mode image data;
a plotter that prints an image, based on the color save-mode image data, onto a recording medium with low consumption of coloring material; and
a transmitting unit that transmits the first image data and the color save-mode image data as a file to an external device, wherein
in the save-mode, the image processing apparatus generates an image file including a header, the first image data and the color save-mode image data, and transmits the image file including the header, the first image data and the color save-mode image data to the external device, and
the header of the image file includes address information, and any one of the first image data and the color save-mode image data is extractable from the image file by using the address information in the header.

4. The image processing apparatus according to claim 3, wherein the converting unit reduces resolution of the first image data to obtain the first image data with a low resolution.

5. The image processing apparatus according to claim 3, wherein the converting unit reduces resolution of the color save-mode image data to obtain the color save-mode image data with a low resolution.

6. The image processing apparatus according to claim 3, wherein the converting unit reduces resolution of the first image data to obtain the first image data with a low resolution, and reduces resolution of the color save-mode image data to obtain the color save-mode image data with a low resolution.

7. The image processing apparatus according to claim 3, further comprising an output unit that outputs the color save-mode image data onto a recording medium with low consumption of coloring material.

8. An image processing method performed by an image forming apparatus, said method comprising:
setting a mode for first image data to be output, the mode including a save-mode to reduce color of image data;
converting by the image forming apparatus, when the save-mode is set, the first image data to color save-mode image data by reducing color of the first image data;
printing by a plotter of the image forming apparatus an image, based on the color save-mode data, onto a recording medium with low consumption of coloring material; and
transmitting by the image forming apparatus the first image data and the color save-mode image data as a file to an external device, wherein
in the save-mode, the image forming apparatus generates an image file including a header, the first image data and the color save-mode image data, and transmits the image file including the header, the first image data and the color save-mode image data to the external device, and
the header of the image file includes address information, and any one of the first image data and the color save-mode image data is extractable from the image file by using the address information in the header.

9. The image processing method according to claim 8, wherein the converting includes reducing resolution of the first image data to obtain the first image data with a low resolution.

10. The image processing method according to claim 8, wherein the converting includes reducing resolution of the color save-mode image data to obtain the color save-mode image data with a low resolution.

11. The image processing method according to claim 8, wherein the converting includes:
reducing resolution of the first image data to obtain the first image data with a low resolution; and
reducing resolution of the color save-mode image data to obtain the color save-mode image data with a low resolution.

12. The image processing method according to claim 8, further comprising outputting the color save-mode image data onto a recording medium with low consumption of coloring material.

* * * * *